April 18, 1961 R. M. DILLE ET AL 2,980,521
CARBON SEPARATION PROCESS
Filed Dec. 19, 1958 nited States Patent Office 2,980,521
Patented Apr. 18, 1961

2,980,521

CARBON SEPARATION PROCESS

Roger M. Dille and Ronald W. Chapman, Whittier, Calif., assignors to Texaco Inc., a corporation of Delaware Filed Dec. 19, 1958, Ser. No. 781,630

17 Claims. (Cl. 48—196)

This invention relates to a process for the production of synthesis gas from carbonaceous fuels. More specifically, the invention is concerned with improvements in a method for the separation and recovery of free carbon particles from a carbon-water slurry formed in a synthesis gas generation process.

It is known that in the production of synthesis gas by the partial oxidation of a solid hydrocarbonaceous material there is obtained as a by-product a certain amount of finely-divided carbon in the resulting product gases, carbon monoxide and hydrogen. It is also known that the presence of these solid carbon by-products in the gaseous products obtained from a synthesis gas generator interfere with the main reactions in subsequent processes for conversion of the synthesis gas products into hydrocarbons, ammonia, and oxygenated hydrocarbons, e.g., Fisher-Tropsch type synthesis, ammonia synthesis, or methanol etc. synthesis.

Many methods have been proposed to effect separation of the free carbon particles from the synthesis gas products. These known carbon separation methods in general comprise treatment of the effluent products from the synthesis gas generator with water or water containing a low molecular weight oxygenated hydrocarbon in a scrubbing tower to effect removal of the entrained carbon particles therefrom and the removed carbon particles are then withdrawn from the scrubbing zone in the form of a carbon-water slurry. In general the carbon content of the slurry varies from about 0.1% to about 3% by weight dependent on the generator feed stocks and reaction conditions in the generator. The carbon particles are thereafter separated from the carbon-water slurry in a conventional manner such as by filtration or by evaporation. When the carbon is separated from the slurry by a filtration operation the resulting water filtrate is commonly recycled to the scrubbing tower for reuse as the scrubbing liquid by suitable piping, pumps, etc.

The carbon particles separated from the aqueous slurry are not suited for immediate use as fuel feed stock or in carbon black manufacture because of the high water content of such particles. The carbon particles recovered from the slurry in a filtration operation contain from about 80 to about 90 or 95 weight percent water, the balance carbon. In order to utilize the carbon particles recovered from a filtration operation in an efficient and economical manner it is generally necessary to decrease the water content of the filter cake somewhat, particularly when the carbon is to be used as a fuel feed stock. One know method of decreasing the water content of the carbon filter cake is by an evaporation operation but this method is not completely satisfactory in large scale indutsrial operations due to the considerable amount of heat required and also the equipment needed for such an operation. Solvent extraction has been employed heretofore in the separation of undesirable liquids including water from materials but such methods likewise have certain objectionable features such as, solvent handling and solvent loss which make them unattractive to industry.

We have now surprisingly found that these disadvantages can be overcome or avoided and that the water content of the separated carbon particles can be substantially decreased by the hereinafter described process of the present invention.

The present invention comprises separating the carbon particles from the carbon water slurry in a separation zone in the presence of a water-soluble nonionic wetting agent. The recovered carbon particles of reduced water content may be utilized as a fuel feed stock for a fuel-consuming operation or employed in the form of carbon black in the manufacture of rubber products without further treatment for reduction of its water content.

Water-soluble nonionic surface active wetting agents which have been found to be useful in the process of the present invention are those comprising the polyalkylene oxide adducts of aliphatic alcohols and alkyl substituted phenols. The polyalkylene oxide adducts contain a minimum of about 8 alkylene oxide groups per molecule. These nonionic wetting agents have the general formula $RO(R'O)_nH$ wherein R is an aliphatic hydrocarbon radical containing 8 or more carbon atoms or an alkyl-aryl hydrocarbon radical in which the alkyl group contains an average of at least 3 carbon atoms, R' is a divalent $C_2$ or $C_3$ aliphatic hydrocarbon radical and $n$ has a value of at least 8 and preferably from 10 to 16.

We have found that satisfactory results are obtained by employing the water-soluble wetting agent in the process of the present invention in amounts of from about 10 to about 500 weight percent, based on the weight of carbon particles present in the slurry. However, amounts of the wetting agent in the range of about 100 weight percent to about 500 weight percent, based on weight of carbon particles in the aqueous slurry are preferred for the most satisfactory results.

In carrying out the process of the invention it is desirable to provide a carbon concentration in the carbon-water slurry of from about 0.1 to about 2 to 3 percent by weight. It is preferred that the range of carbon present in the slurry be from about 0.4% to about 1.5% by weight for the most satisfactory results, with a range of from about 0.5 to about 1%, being particularly preferred for optimum results.

In the process of the invention, separation of the carbon particles from the carbon-water slurry can be accomplished by filtration or by use of a centrifugal separator. In a preferred embodiment, the carbon particles are recovered from the slurry by a rotary vacuum filtration operation at a pressure of about 10 pounds per square inch, absolute.

For the purpose of more fully describing the novel features of the invention and to provide for a better understanding of same, reference is had to the accompanying drawings in which.

Various conventional pieces of equipment such as pumps, valves, etc. which are readily apparent to those skilled in the art have been omitted from the drawings for the sake of clarity.

Figure 1:
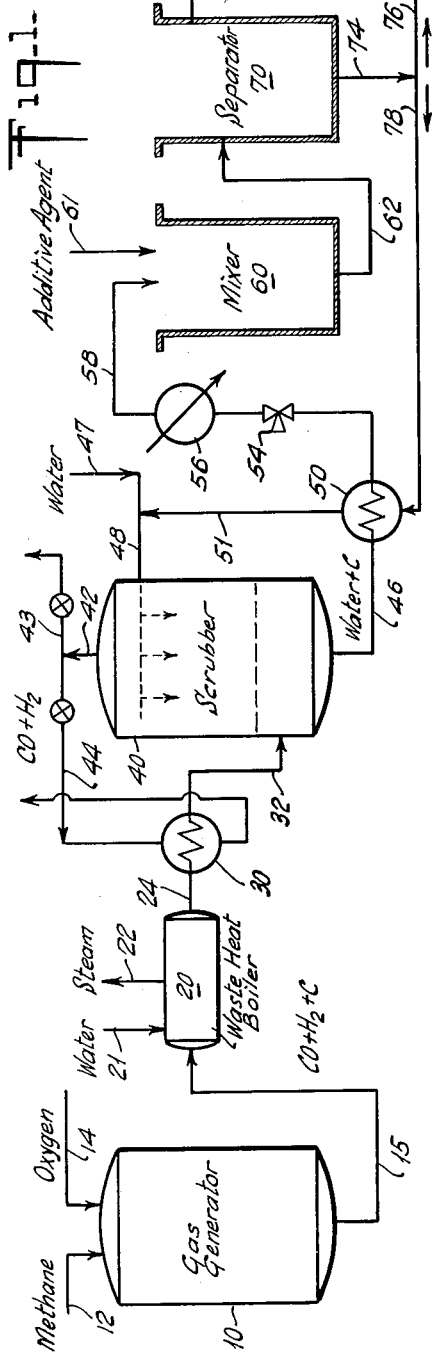
Fig. 1 is a diagrammatic illustration of one embodiment of the process of the present invention.

Referring now to the drawings in detail and to Fig. 1 in particular, in the reaction zone of a synthesis gas generator 10 a mixture of methane and oxygen introduced therein by feed lines 12 and 14, respectively, is subjected to controlled partial combustion at elevated temperatures and superatmospheric pressures whereby hot gaseous products of partial combustion including carbon monoxide, hydrogen, and free carbon particles are produced.

The generator effluent comprising the hot gaseous combustion products CO and $H_2$ and the free carbon particles is withdrawn through line 15 from the generator 10 and passed to a waste heat boiler 20 whereby the generator effluent is cooled to a temperature not substantially above 800° F., and preferably not above about 450° F. A cooling liquid such as water is passed through line 21 to boiler 20 and by-product steam is withdrawn therefrom by line 22 for utilization as a source of heat in the system. The resulting partially cooled generator effluent is then fed through line 24, through indirect heat exchanger 30 where further cooling is effected, then passed through line 32 to a scrubbing tower or zone 40 wherein the free carbon particles (in the generator effluent) are separated from the generator effluent gases. Carbon separation is accomplished in the tower 40 by counter-current contacting of the generator effluent gases with an aqueous scrubbing liquid that is introduced into the upper portion of scrubber 40 through line 48. Scrubbing liquid is fed through line 47 to feed line 48 from a water source not shown. Optionally, make-up fresh water can be passed through lines 47 and 48 and mixed in line 48 with water recovered at a subsequent point in the process, i.e. from separator 70; said recovered water being passed to line 48 through feed lines 74 and 78, heat exchanger 50 and feed line 51. The scrubbed effluent synthesis gases are removed from scrubber 40 by way of line 42 and passed to storage facilities not shown or to a synthesis gas reaction zone through line 43, for example, an oxide ore reduction zone or a hydrocarbon synthesis zone. If desired, the scrubbed synthesis gases can be passed from scrubber 40 through line 42 and line 44 to heat exchanger 30 to serve as the cooling agent therefor, before being passed to storage facilities or utilized in a synthesis gas reaction zone.

The aqueous wash liquid or slurry containing the carbon particles removed from the generator gas products is withdrawn from scrubber 40 through line 46 and passed through a heat exchanger 50 to reduce the temperature of the slurry to about 150° F., then passed through line 52 and pressure-reducing valve 54, whereby the pressure on the slurry is decreased to substantially atmospheric pressure, then passed to cooling zone 56 to further reduce the temperature of the slurry to about 70° F. to 115° F. The cooled slurry is then passed through line 58 to a mixing tank 60 wherein the carbon-water slurry is blended with the nonionic additive agent introduced into vessel 60 through line 61. If desired, vessel 60 can be provided with suitable mechanical mixing means, not shown, to assist in the mixing of the slurry and the additive agent. The resulting aqueous mixture is withdrawn through line 62 from vessel 60 and passed to a separation zone 70 wherein the carbon is separated from the wash liquid by filtration or by centrifugation. The recovered carbon is withdrawn through line 72 from separation zone 70.

The substantially carbon-free aqueous liquid is withdrawn from separation zone 70 through line 74 and may be recycled through line 78 to heat exchanger 50, serving as the cooling agent therefor, then passed through line 51 to scrubbing water feed line 48. Optionally, a portion of the filtrate can be withdrawn from line 74 and passed through line 76 to storage facilities not shown, or can be discarded.

In the case when the filtrate from separation zone 70 is recycled to the scrubbing zone 40 by way of lines 74, 78, heat exchanger 50, lines 51 and 48, it is desirable to maintain the temperature within the scrubbing zone 40 below about 350° F. for the most satisfactory results.

Figure 2:
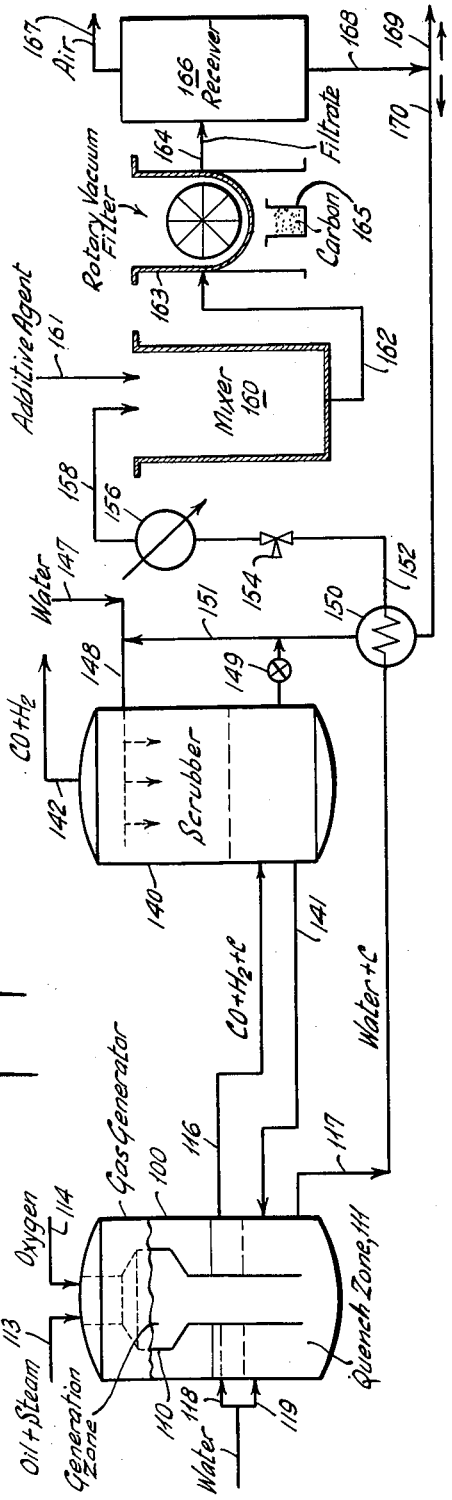
Fig. 2 is a diagrammatic view of another and preferred embodiment of the present invention.

In a second modification of the invention, and with reference to Fig. 2 of the drawings, a preheated mixture of steam and hydrocarbon oil from feed line 113 is reacted with oxygen from feed line 114 in a reaction zone 110 which is internally disposed in the upper portion of a pressure vessel 100. The hot reaction products including by-product free carbon particles are passed to quench zone 111 located in the lower portion of vessel 100 and therein are contacted with a quench water stream introduced into the quench zone 111 through lines 118 and 119, respectively. Desirably a pool of water is maintained in quench zone 111 to aid in rapid cooling of the generation zone effluent. In quench zone 111, the hot products of combustion are partially cooled by water introduced therein by feed lines 118 and 119, respectively, and at least partial separation of carbon particles from the product gases is effected in the quench zone by entrainment with water.

The partially cooled gaseous reaction products including at least part of the by-product free carbon particles are withdrawn from quench zone 111 through line 116 and passed therethrough to a scrubbing zone 140 for further removal of the free carbon particles from the main gaseous products of the generation zone by the scrubbing action of the aqueous wash liquid introduced into tower 140 through feed line 148. The aqueous liquid, obtained from an external source not shown, is fed to scrubber 140 through line 147 and line 148. A portion of the liquid wash water can also be furnished to tower feed line 148 through line 151, the water being obtained from receiver 166 and passed to line 151 through lines 168, 170 and heat exchanger 150.

The scrubbed gases substantially free of carbon particles are removed from the scrubber 140 by way of line 142 for further processing. The pool of scrubbing liquid accumulated in the lower portion of scrubber 140 containing the carbon particles scrubbed from the generation zone product gases, may be recycled through line 149 and line 151 to the feed line 148 at the upper portion of scrubber 140 when it is desired to increase the concentration of the carbon particles in the wash liquid before final withdrawal of the carbon-water slurry from scrubber 140. The scrubbing water accumulated in the lower portion of the tower and containing the carbon particles removed from the gas stream in scrubber 140 is passed through line 141 to quench zone 111 to effect further cooling of the generator effluent introduced into the quench zone and also to remove at least a part of the carbon particles from the fresh synthesis gas products being introduced into zone 111 from generation zone 110. The resulting concentrated slurry of carbon in water is passed through line 117 from quench zone 111 to heat exchanger 150 to effect a reduction of the temperature of the carbon-water slurry to about 120° to 200° F., preferably about 150° F., then passed through line 152 through pressure-reducing valve 154 whereby the pressure of the slurry is decreased to about atmospheric pressure, but not above about 20 p.s.i.g. and then passed to a cooling zone 156 to further reduce the temperature of the slurry to a temperature between about 70° F. to 125° F. The resulting cooled slurry is then passed through line 158 to a mixing vessel or tank 160 wherein the slurry is intimately mixed with the water-soluble nonionic additive agent of the invention which is fed to vessel 160 through line 161. The resulting mixture is passed by way of line 162 to a separation zone 163 which is provided with a rotary vacuum filter for removal of the water from the carbon particles. The separated carbon particles having a reduced water content are collected in the form of a filter cake in a suitable container or vessel 165.

The water filtrate from the separation zone 163 is passed from the filter 163 through line 164 to a receiver 166 for removal of entrapped air through line 167. The filtrate is then withdrawn from the receiver by way of line 168. The filtrate in line 168 can be discarded by passage through line 169 or it may be fed through line 170 to heat exchanger 150 to serve as the cooling agent therefor, then passed by way of line 151 to feed line 148 which supplies scrubbing liquid to scrubbing tower 140. Optionally, a portion of the filtrate in line 168 which has been withdrawn from receiver 166 can be discarded through line 169 and the remaining portion can be passed to heat exchanger 150 through line 170.

EXAMPLE 1

A carbon-water slurry containing 1.0% by weight of by-product carbon particles produced in a synthesis gas generation zone was blended with a water-soluble nonionic surface active agent comprising a $C_4$ alkyl phenyl ether of polyethylene glycol having an average of about 10 repeating ethylene oxide units. Sufficient of the additive agent was used so that the resulting slurry contained 15.3% by weight basis carbon in the slurry.

The resulting mixture was subjected to mechanical agitation to ensure thorough mixing of the slurry and the additive agent, then the mixture was filtered using a rotary vacuum filter under a reduced pressure of 10 p.s.i.a. to separate the carbon particles from the mixture.

The carbon content of the resulting filter cake was determined and is reported in the table below. The water content of the filter cake is also shown in the table, this value being obtained by difference (i.e. 100% less wt. percent carbon equals percent water content).

The table further shows the carbon content of a filter cake obtained in a manner similar to the one described in Example 1, except that no additive agent was used in this run. This comparative run is reported as Control "A." The table shows the concentration of the carbon particles in the slurry in both runs and the amount of the additive agent used in Example 1.

EXAMPLES 2-12

Following the procedure of Example 1 additional runs were made wherein varying amounts of the additive agent of Example 1 were blended with the carbon-water slurry obtained in a synthesis gas generation process. The carbon content of the slurry was also varied in some of these runs. In each example, the method employed in recovering the carbon particles from the slurry additive agent mixture was the same as the method used in Example 1.

The table shows the amount of carbon present in the slurry in each of these examples, together with the amount of the additive agent used as well as the results of analysis of the carbon content of the separated filter cake. Control "B" represents a run made on a carbon-water slurry wherein the carbon content was 0.44% by weight. No additive agent was used in this run. The carbon content of the filter cake obtained from this run is shown in the table.

Table

| Example | Carbon in slurry (wt. percent) | Additive Agent (wt. percent basis carbon) | Carbon Content of filter cake (wt. percent) | Water Content of filter cake (wt. percent) |
|---|---|---|---|---|
| Control A | 1.0 | none | 14.0 | 86.0 |
| 1 | 1.0 | 15.3 | 31.8 | 68.2 |
| 2 | 1.0 | 48.3 | 29.8 | 70.2 |
| 3 | 1.0 | 100 | 29.3 | 70.7 |
| 4 | 1.0 | 498 | 50.8 | 49.2 |
| Control B | 0.44 | none | 6.2 | 93.8 |
| 5 | 0.44 | 2.0 | 6.7 | 93.3 |
| 6 | 0.44 | 3.0 | 6.2 | 93.8 |
| 7 | 0.44 | 4.0 | 6.5 | 93.5 |
| 8 | 0.44 | 10.0 | 8.7 | 91.3 |
| 9 | 0.44 | 20 | 8.9 | 91.1 |
| 10 | 0.44 | 100 | 10.9 | 89.1 |
| 11 | 0.44 | 200 | 12.4 | 87.6 |
| 12 | 0.44 | 300 | 17.8 | 82.2 |

The effectiveness of the addition agent of the present invention in reducing the water content of carbon particles recovered from the carbon-water slurry is clearly shown in the foregoing table of data. In the table, the data presented in Examples 1 to 4 show there is a material reduction in the water content of the filter cake obtained from the aqueous carbon slurry containing the water-soluble nonionic additive agent in amounts of from about 15 to 498% by weight basis carbon content. Examples 8 through 12 inclusive indicate that similar results can be obtained with varying amounts of the additive agent in aqueous carbon slurries. Examples 5, 6 and 7 demonstrate that the water content of a separated carbon filter cake is not appreciably changed with the use of small quantities of the additive agent. Controls A and B show the water content of a carbon filter cake obtained from a carbon slurry which is free from the additive agent.

Obviously, many modifications and variations of the process of the invention can be made without departing from the spirit and scope thereof and therefore only such limitations should be imposed as are expressly indicated in the foregoing description and appended claims.

We claim:

1. In a process for the generation of a synthesis gas mixture by partial oxidation of a hydrocarbonaceous material at an elevated temperature and pressure in which the generated gas mixture comprising carbon monoxide and hydrogen contains minor amounts of solid carbon particles produced by said partial oxidation process, and the generated gas mixture is contacted in a scrubbing zone with an aqueous liquid to effect removal of said carbon particles from the mixture with the resulting formation of an aqueous slurry of said carbon particles, the improvement which comprises incorporating an additive agent consisting of a water soluble nonionic surface active agent having the general formula $RO(R'O)_nH$, wherein R is a member selected from the group consisting of an aliphatic hydrocarbon radical containing 8 or more carbon atoms and an alkaryl hydrocarbon radical in which the alkyl group contains an average of at least 3 carbon atoms, R' is a member selected from the group consisting of divalent $C_2$ and $C_3$ aliphatic hydrocarbon radicals, and n has a value of at least 8, in the aqueous slurry in an amount of at least about 10% by weight, basis weight of free carbon present, said amount being sufficient to decrease the water content of the separated carbon particles and thereafter separating carbon particles of reduced water content from the slurry.

2. Process as claimed in claim 1, in which separation of the carbon particles from the aqueous carbon slurry containing the water-soluble nonionic surface active agent is carried out by filtration under vacuum.

3. Process as claimed in claim 1, in which the slurry contains from about 0.1 to about 2.0 percent by weight of carbon particles.

4. Process as claimed in claim 1, in which the slurry contains from about 0.5 to about 1.0 percent by weight of carbon particles.

5. Process as claimed in claim 1, in which the nonionic surface active agent is a water soluble $C_4$ alkyl phenyl ether of polyethylene glycol having an average of about 10 repeating ethylene oxide units.

6. Process as claimed in claim 1, in which the nonionic surface active agent is employed in an amount of from about 10 percent to about 500 percent, based on the weight of carbon particles present in the slurry.

7. Process as claimed in claim 1, in which the surface active agent is employed in an amount of from about 50 percent to about 500 weight percent, based on the weight of carbon present in the slurry.

8. Process as claimed in claim 1, in which the slurry contains at least 20 weight percent of the nonionic surface active agent based on weight of carbon present therein.

9. Method of decreasing the water content of carbon particles separated from a carbon-water slurry obtained in a partial oxidation process for the conversion of a hydrocarbonaceous material into a synthesis gas mixture comprising carbon monoxide and hydrogen which also contains free carbon particles which are removed therefrom by scrubbing the gas mixture with water with the resultant formation of said carbon-water slurry, said method comprising introducing into the slurry a nonionic surface active agent comprising a water soluble nonionic surface active agent having the general formula $RO(R'O)_nH$, wherein R is a member selected from the group consisting of an aliphatic hydrocarbon radical containing 8 or more carbon atoms and an alkaryl hydrocarbon radical in which the alkyl group contains an average of at least 3 carbon atoms, R' is a member selected from the group consisting of divalent $C_2$ and $C_3$ aliphatic hydrocarbon radicals, and $n$ has a value of at least 8, in an amount of at least about 48 weight percent based on the weight of free carbon present in the slurry and thereafter separating carbon particles having a decreased water content from the slurry.

10. In a partial oxidation process for the production of synthesis gas from a hydrocarbonaceous material wherein the resulting synthesis gas mixture comprising carbon monoxide and hydrogen is scrubbed with water to remove therefrom solid carbon particle by-products with the resultant formation of a carbon-water slurry, the improvement which comprises incorporating a water-soluble nonionic surface active agent comprising a $C_4$ alkyl phenyl ether of ethylene glycol having an average of about 12 repeating ethylene oxide units, said surface active agent being employed in an amount of from about 100 percent to about 500 percent by weight, based on weight of carbon present in the slurry, and subsequently filtering the resulting slurry to recover carbon particles of reduced water content.

11. In a conversion process in which a carbonaceous material is partially oxidized in a reaction zone under superatmospheric pressure in the presence of oxygen and steam to produce a hot gaseous product containing free carbon particles and the hot gaseous product is contacted with water in a scrubbing zone to remove the carbon particles and form a carbon-water slurry, the improvement which comprises passing the carbon-water slurry through a first cooling zone wherein the temperature of the slurry is decreased, passing the resulting cooled slurry through a pressure-reducing zone wherein the pressure on the slurry is lowered, passing the resulting slurry through another cooling zone wherein the temperature of the slurry is further decreased, passing the resulting slurry to a mixing zone wherein a water-soluble nonionic surface active agent comprising a $C_4$ alkyl phenyl ether of ethylene glycol having an average of about 12 repeating ethylene oxide units is blended with the slurry in an amount of at least about 10% by weight, basis free carbon present in the slurry, said amount being sufficient to decrease the water content of the hereinafter separated carbon particles, and thereafter passing the blended mixture to a separation zone wherein free carbon particles of reduced water content are recovered by filtration at a pressure less than atmospheric pressure.

12. In a process for the production of carbon monoxide from a carbonaceous fuel wherein said fuel is reacted with oxygen in a reaction zone under superatmospheric pressure and a high temperature to produce a hot gaseous product containing particles of free carbon and said gaseous product is contacted with water in a contacting zone to remove said carbon particles therefrom and form a dispersion of the carbon particles in water and said carbon particles are recovered therefrom by mechanical separation, the improvement which comprises contacting the gaseous products of combustion with water containing a water soluble nonionic surface active agent comprising a $C_4$ alkyl phenyl ether of ethylene glycol having an average of about 12 repeating ethylene oxide units in an amount of at least about 50% by weight, basis free carbon present, said amount being sufficient to decrease the water content of the hereinafter recovered carbon particles and thereafter recovering carbon particles or reduced water content from said dispersion by mechanical separation.

13. Process of claim 12 in which prior to said mechanical separation the dispersion is intimately commingled in a quench zone with an additional portion of the hot gaseous products from the reaction zone to effect concentration of the carbon particles in said dispersion, said concentrated dispersion is subjected to temperature reduction, the resulting cooled dispersion is subjected to pressure reduction to substantially atmospheric pressure, and thereafter the resulting dispersion is subjected to said mechanical separation.

14. Process as claimed in claim 12 in which mechanical separation is carried out by filtration at a pressure less than atmospheric pressure.

15. Process as claimed in claim 12 in which separation is carried out by centrifugation.

16. Process as claimed in claim 12 in which the nonionic surface active agent is employed in an amount of from about 100 percent to about 500 percent, based on the weight of carbon particles present in the dispersion.

17. Process as claimed in claim 12 in which the nonionic surface active agent is employed in an amount of from about 100 percent to about 300 weight percent, based on the weight of carbon present in the dispersion.

References Cited in the file of this patent

UNITED STATES PATENTS

| | | |
|---|---|---|
| Re. 22,454 | Wiegand et al. | Mar. 7, 1944 |
| 2,585,659 | Kilpatrick | Feb. 12, 1952 |
| 2,665,980 | Carkeek | Jan. 12, 1954 |
| 2,746,564 | Williams | May 22, 1956 |
| 2,793,938 | Frank | May 28, 1957 |
| 2,864,765 | Stoneman et al. | Dec. 16, 1958 |